United States Patent

[11] 3,603,508

| [72] | Inventors | Carl B. Ingram<br>12366 E. Elliott Ave., El Monte, Calif. 91732;<br>Louis E. Watson, 1492 N. Mountain, Claremont, Calif. 91711 |
|---|---|---|
| [21] | Appl. No. | 808,784 |
| [22] | Filed | Mar. 20, 1969 |
| [45] | Patented | Sept. 7, 1971 |

[54] ROLL-TYPE FIELD IRRIGATION DEVICE WITH WEIGHT SELF-ALIGNING RISER OUTLET AND AUTOMATIC DRAIN UNITS
3 Claims, 4 Drawing Figs.

[52] U.S. Cl. ............................................. 239/111, 239/212, 239/267, 239/587, 285/190
[51] Int. Cl. ..................................................... B05b 15/02
[50] Field of Search ................................................ 239/177, 212, 213, 266, 267, 286, 550, 587, 110, 111; 285/5, 6, 190

[56] References Cited
UNITED STATES PATENTS

| 2,540,948 | 2/1951 | Jeffery ........................... | 285/190 X |
| 3,045,922 | 7/1962 | Jensen ........................... | 239/212 X |
| 3,090,566 | 5/1963 | Snyder et al. .................. | 239/212 X |
| 3,193,204 | 7/1965 | Walton et al. .................. | 239/286 |
| 3,298,388 | 1/1967 | Purtell ........................... | 239/177 X |
| 3,339,576 | 9/1967 | Skains ........................... | 239/212 X |
| 3,442,539 | 5/1969 | Randall ......................... | 285/190 |

Primary Examiner—M. Henson Wood, Jr.
Assistant Examiner—Michael Y. Mar
Attorney—Boniard I. Brown ABSTRACT: A roll-type mobile field irrigation device is provided with weighted self-aligning riser and drain units. The irrigation device has a long roll pipe adapted for connection to a supply of water under pressure and a number of ground wheels coaxially mounted on the pipe at positions spaced along the pipe to permit the device to be rolled across a field to be irrigated for the purpose of locating the device at selected irrigation stations spaced about the field. The riser drain units are freely rotatable on the roll pipe and are eccentrically weighted to automatically assume aligned upright positions when the pipe is rolled to a new irrigating position.

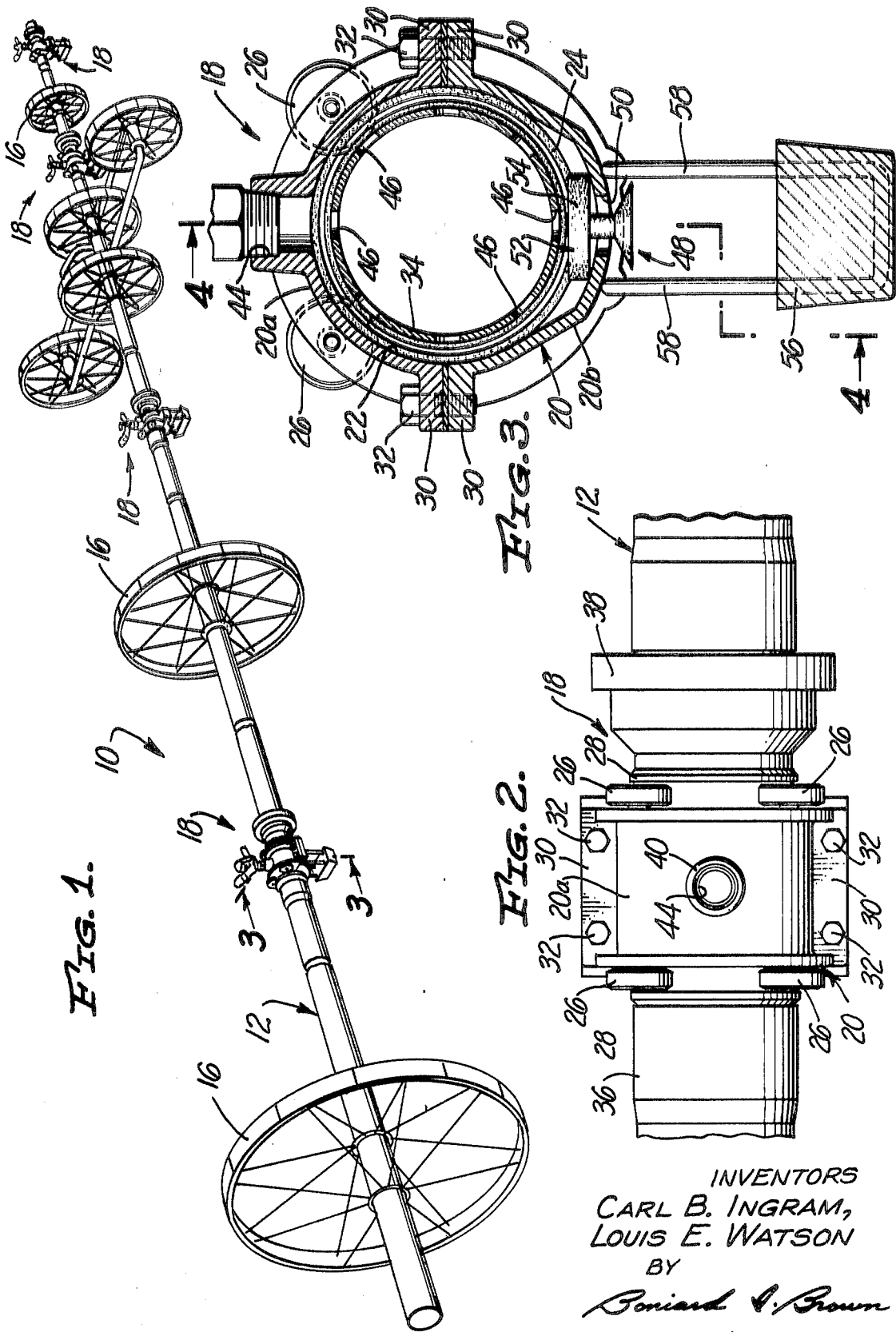

INVENTORS
CARL B. INGRAM,
LOUIS E. WATSON
BY

ATTORNEY

ROLL-TYPE FIELD IRRIGATION DEVICE WITH WEIGHT SELF-ALIGNING RISER OUTLET AND AUTOMATIC DRAIN UNITS

BACKGROUND OF THE INVENTION

1. Field of the Invention

This invention relates generally to irrigation devices for large agricultural fields and the like. More particularly, the invention relates to a roll-type field irrigation device with novel weighted self-aligning riser outlet and automatic drain units.

2. Prior Art

A wide variety of irrigation methods and devices have been devised for irrigating large agricultural fields and the like. One general class of irrigation device for this purpose comprises a mobile pipeline which is adapted for connection to a supply of water under pressure and mounts sprinkler heads, such as Rain Bird heads, for watering the adjacent area of the field to be irrigated. Such a pipeline is so constructed and arranged that it may be easily transported to different selected irrigation stations or positions spaced about the field. One type of existing irrigation device of this class is equipped with means to support the pipe line for longitudinal movement across a field from one irrigation station to the next. Another type of irrigation device of the same general class is equipped with large ground wheels which are coaxially mounted at intervals along the irrigation pipeline and support the line for lateral rolling movement across a field from one irrigation station to the next. The pipe also mounts automatic drain valves which open when the water to the pipe is cut off. These valves drain the residual water from the pipe so as to reduce its weight for ease of movement of the pipe. The present invention is concerned generally with such roll-type irrigation devices.

In many existing roll-type irrigation devices, the sprinkler risers and drain valves rotate with the irrigation pipe. As a result, when rolling the pipe from one location to another, care must be exercised to bring the pipe to rest in the proper angular position at the new location wherein the sprinkler risers are located at the top and the drain valves at the bottom of the pipe. This is necessary, of course, to assure proper irrigation of the surrounding area and proper draining of the pipe prior to its movement to its next location. This proper alignment of the sprinkler heads and drain valves is difficult to accomplish.

A variety of self-aligning sprinkler risers have been devised for roll-type irrigation devices which seek to eliminate the above disadvantage of irrigation devices with fixed risers. While these self-aligning risers offer some advantage over fixed risers, they possess two inherent deficiencies. First, the self-aligning action of these risers is effective only if the riser outlets are no more than 90° from the vertical. It is often quite difficult to maintain sufficiently accurate longitudinal alignment of the several risers on an irrigation roll pipe, at least one of relatively long length, to assure that all of the riser outlets will come to rest within the required angle from the vertical. Secondly, even if the riser outlets are within the required angle from the vertical, the drain ports may not be properly located to completely drain the irrigation pipe. Thus, if the pipe is brought to rest in a position wherein the risers are 90° off the vertical, such that their self-aligning action will be effective, the drain ports will also be located 90° from the bottom of the pipe. Under these conditions, the pipe would not drain properly.

SUMMARY OF THE INVENTION

The present invention provides an improved roll-type dragline irrigation device of the character described which avoids the above deficiencies of the existing irrigation devices with self-aligning risers. According to the present invention, the irrigation pipe is equipped with weighted self-aligning riser-drain units each having a normally upper riser outlet and a normally lower automatic drain valve. The riser outlet and drain valve are carried by a sleeve which surrounds and is sealed at its ends to the pipe. The riser outlet and drain valve are located at diametrically opposite sides of the sleeve. Bearing means, such as bearing rollers journaled on the sleeve and riding on the pipe, support the sleeve for free rotation relative to the pipe and restrain the sleeve against axial movement along the pipe. An annular flow space is provided between the sleeve and pipe which communicates the riser outlet and drain valve to circumferentially spaced ports in the pipe wall. The sleeve is eccentrically weighted, as by a counterweight suspended from the sleeve directly below the drain valve, in such manner that the sleeve always assumes a position on the irrigation pipe wherein the riser outlet is located at the top and the drain valve at the bottom of the pipe.

Each time the irrigation device is moved to a new location to be irrigated, the self-aligning riser-drain units automatically align themselves in their normal upright positions with their riser outlets at the top of their drain valves at the bottom of the irrigation pipe. Arresting on the pipe in a particular angular position is thus unnecessary. A feature of the invention resides in the fact that the sleeve of the self-aligning unit is split along a diametrical parting plane to permit its installation about the irrigation pipe without uncoupling the pipe.

BRIEF DESCRIPTION OF THE DRAWINGS

FIG. 1 is a perspective view of the irrigation device;

FIG. 2 is an enlarged top plan view of one self-aligning unit;

FIG. 3 is an enlarged section taken on line 3—3 space in FIG. 1; and

DESCRIPTION OF THE PREFERRED EMBODIMENT

Figure 4:
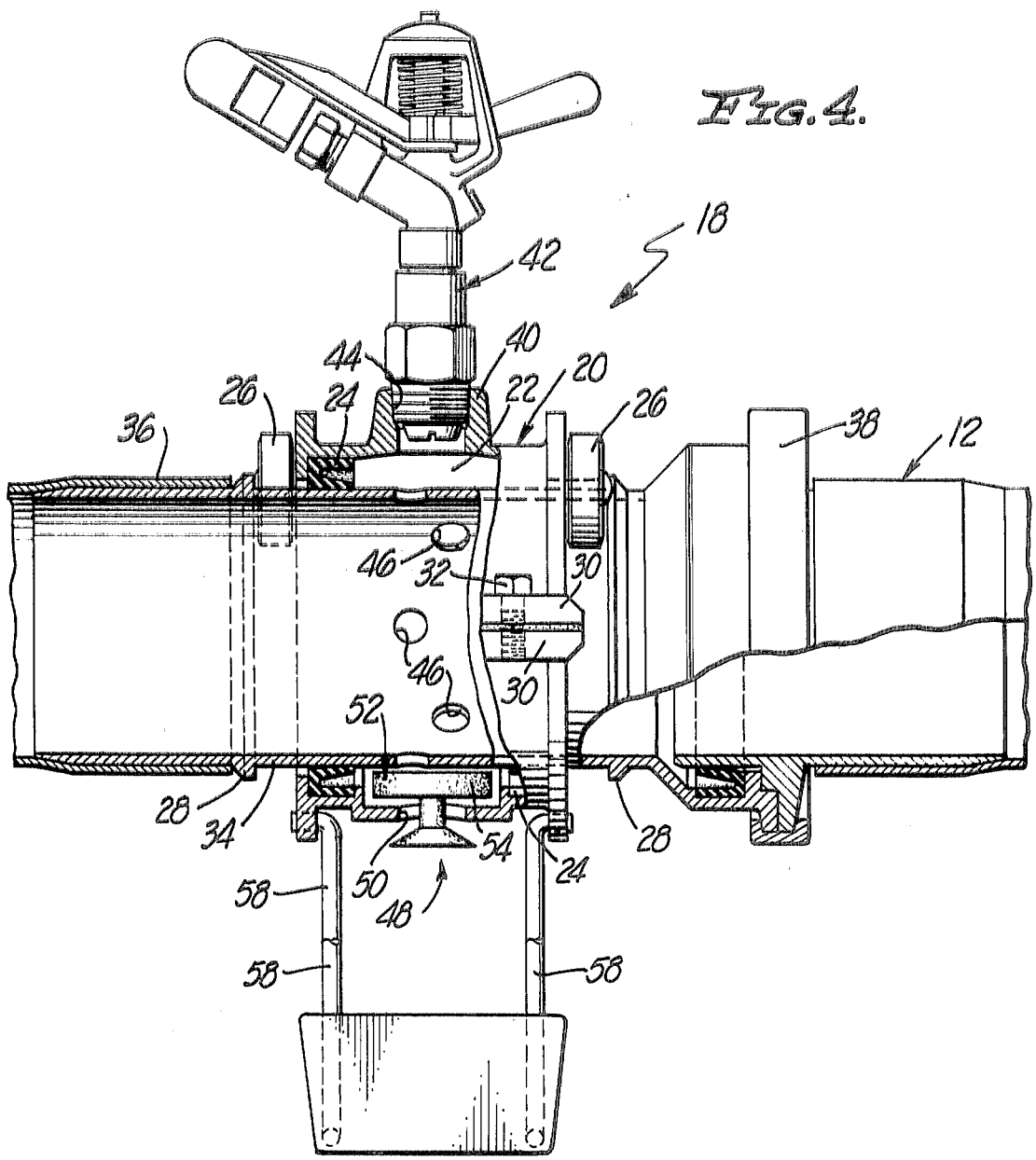
FIG. 4 is a section taken on line 4—4 in FIG. 3.

Referring now to these drawings, there is illustrated a roll-type irrigation device 10 according to the invention. This irrigation device has a long irrigation pipeline 12 which, as noted earlier, is commonly referred to as a roll pipe. Roll pipe 12 may be several hundred feet in length. The pipe is made up in several sections which are joined end to end. At one end of the roll pipe is a coupling (not shown) for connecting the pipe to a supply of water under pressure. Coaxially mounted on the roll pipe at generally uniform intervals therealong are large ground wheels 16. These ground wheels are rigid on the pipe and support the irrigation device for rolling movement across a field to be irrigated, from one irrigation position or station to another.

Mounted on the irrigation pipe 12 at generally uniform intervals therealong are weight self-aligning riser-drain units 18 according to the present invention. The several units are essentially identical so that a description of one will suffice for all. Each self-aligning unit has a sleeve 20 surrounding the pipe 12. The internal diameter of the sleeve is greater than the external diameter of the pipe so that an annular clearance or flow space 22 is provided between the pipe and sleeve. Seals 24 are placed within this space, adjacent the ends of the sleeve, to seal the sleeve to the pipe. Rotatably mounted on the ends of the sleeve are bearing rollers or wheels 26. These wheels are mounted on that portion of the sleeve which is located at the top of the irrigation pipe 12 in the normal upright position of the self-aligning unit shown in FIG. 4. For convenience in the ensuing description, this portion of the sleeve is referred to as the top of the sleeve and the diametrically opposite portion of the sleeve is referred to as the bottom of the sleeve. Wheels 26 engage the outer surface of the roll pipe 12 to rotatably support the sleeve on and in coaxial relation to the pipe. Encircling the irrigation pipe at opposite ends of the sleeve 20 are annular, axially presented thrust shoulders 28 against which the bearing wheels 26 laterally engage and ride.

According to a feature of the invention, each sleeve 20 is split along a diametrical parting plane into top and bottom semicylindrical sections 20a 20b. These sections have abutting flanges 30 which are joined by bolts 32. This permits the sleeve to be installed about the irrigation pipe 12 without uncoupling the pipe. In this regard, it will be observed that the portion of the irrigation pipe surrounded by the sleeve comprises a separate short pipe section 34, one end of which is fixed within a flared end 36 of the irrigation pipe proper. The other end of the pipe section 34 is connected to the irrigation pipe proper by a sealed pipe coupling 38. The bearing wheel thrust shoulders 28 are integrally formed on the pipe section 34. It should be noted here that this particular pipe and sleeve arrangement is not the only configuration which may be used in the invention. Copending application Ser. No. 741,768, for example, shows an alternative arrangement which may be employed, wherein the riser and drain sleeve surround the irrigation pipe proper and the thrust shoulders are provided by bands clamped to the pipe.

Formed in the top of the sleeve 20 is an internally threaded riser 40 for receiving a sprinkler head 42. In this instance the head is a Rain Bird head. However, it will be understood that other types of heads may be used. The riser outlet 44 opens to the annular clearance space 22 which, in turn, communicates to the interior of the irrigation pipe 12 through ports 46 circumferentially spaced about the pipe wall.

Mounted within the bottom of the sleeve 20, diametrically opposite the riser 40, is an automatic drain 48. This drain comprises a drain port 50 in the bottom of the sleeve and a drain valve 52 positioned within the port. The drain valve has an inner resilient head 54 and is constructed and arranged so that high pressure water within the irrigation pipe 12 deforms the valve head into sealing engagement with the edge of the drain port 50 to close the latter. When the supply of water to the pipe is cut off, the valve head returns to its normal condition of FIG. 3 to permit water to drain from the pipe through the drain port.

The sleeve 20 is eccentrically weighted to normally assume its upright position of FIGS. 3 and 4 wherein the riser 40 is located at the top and the drain 48 at the bottom of the pipe 12. In this instance, the sleeve is weighted by a mass or counterweight 56 suspended by hangers 58 from the bottom of the sleeve.

It is now evident that when the irrigation pipe 12 is moved to a new location to be irrigated, the self-aligning riser-drain units 18 automatically assume their upright positions regardless of the angular position of the pipe when arrested. When water under pressure is supplied to the pipes, the drains 48 automatically close to provide water under pressure to the sprinkler heads 42. When the water supply to the pipe is cut off, the drains open to drain water from the pipe. In this regard, it is significant to note that the pipe ports 46 allow water to drain from the pipe regardless of its angular position.

We claim

1. A roll-type mobile irrigation device adapted to be rolled across a field to be irrigated to locate the device at selected irrigation stations spaced on the field, said irrigation device comprising:

a long roll pipe adapted for connection to a supply of water under pressure, ground wheels coaxially mounted on said pipe at intervals along the pipe, and a self-aligning unit mounted on said pipe including a sleeve surrounding and sealed at its ends to said pipe, bearing means rotatably supporting said sleeve on and in concentric relation to said pipe, a riser outlet in the wall of said sleeve between its ends, a drain port in said sleeve wall diametrically opposite said outlet, there being flow passage means communicating said outlet and port to the pipe interior in every angular position of said sleeve on said pipe, an automatic drain valve which closes said port in response to water pressure in said pipe and opens said port when the water pressure is cut off, and a solid weight attached to said sleeve diametrically opposite said riser outlet and having a fixed mass sufficient to retain said sleeve in a normal position wherein said outlet and drain port are located at the top and bottom of said pipe, respectively, regardless of the angular position of said pipe.

2 An irrigation device according to claim 1 wherein:

said bearing means comprise bearing rollers on the normally upper portion only of said sleeve at circumferentially opposite sides of said outlet.

3. An irrigation device according to claim 2 including:

annular thrust shoulders on said pipe at opposite ends of said sleeve and laterally engaging said bearing rollers to axially position said sleeve relative to said pipe.